US012277180B2

(12) United States Patent
Miyajima

(10) Patent No.: US 12,277,180 B2
(45) Date of Patent: Apr. 15, 2025

(54) INFORMATION PROCESSING APPARATUS AND METHOD

(71) Applicant: SK TSUSHIN CORPORATION, Tokyo (JP)

(72) Inventor: Kazuhiro Miyajima, Tokyo (JP)

(73) Assignee: SK TSUSHIN CORPORATION

( * ) Notice: Subject to any disclaimer, the term of this patent is extended or adjusted under 35 U.S.C. 154(b) by 0 days.

(21) Appl. No.: 18/147,992

(22) Filed: Dec. 29, 2022

(65) Prior Publication Data
US 2023/0153364 A1 May 18, 2023

Related U.S. Application Data

(63) Continuation of application No. PCT/JP2022/012257, filed on Mar. 17, 2022.

(30) Foreign Application Priority Data

May 26, 2021 (JP) ................. 2021-088053

(51) Int. Cl.
G06F 16/95 (2019.01)
G06F 16/953 (2019.01)
G06N 20/00 (2019.01)

(52) U.S. Cl.
CPC .......... *G06F 16/953* (2019.01); *G06N 20/00* (2019.01)

(58) Field of Classification Search
CPC ...... G06F 16/953; G06F 16/951; G06N 20/00
See application file for complete search history.

(56) References Cited

U.S. PATENT DOCUMENTS

| 10,839,013 | B1 * | 11/2020 | Werris | G06F 40/216 |
|---|---|---|---|---|
| 11,301,540 | B1 * | 4/2022 | Boteanu | G06F 40/279 |
| 2017/0364520 | A1 * | 12/2017 | Venkataraman | G06F 16/248 |
| 2019/0065492 | A1 * | 2/2019 | Cheng | G06F 16/435 |
| 2019/0347668 | A1 * | 11/2019 | Williams | G06N 5/046 |

(Continued)

FOREIGN PATENT DOCUMENTS

| JP | 2006227965 A | 8/2006 |
|---|---|---|
| JP | 2016212533 A | 12/2016 |

(Continued)

OTHER PUBLICATIONS

International Search Report issued on Jun. 21, 2022 in corresponding International Application No. PCT/JP2022/012257; 4 pages.

*Primary Examiner* — Merilyn P Nguyen
(74) *Attorney, Agent, or Firm* — Maier & Maier, PLLC

(57) ABSTRACT

A program executed by a computer having a processor and a memory. The computer stores in a storage unit a trained model generated by training using as training data one or more types of words and a result of searching the Internet with a search engine using one or more types of words as a search query, the trained model receives, as an input, designated words which are words designated by a user, and thereby outputs an article content, and the program causes the processor to execute: receiving an input of at least a first word and a second word different from the first word as first designated words; and outputting a first article content corresponding to the received first designated words, based on the received first word and second word and the trained model.

11 Claims, 7 Drawing Sheets

(56) References Cited

U.S. PATENT DOCUMENTS

| | | | |
|---|---|---|---|
| 2021/0034784 A1* | 2/2021 | Baughman | G06N 3/08 |
| 2022/0107802 A1* | 4/2022 | Rao | G06F 16/907 |
| 2022/0222289 A1* | 7/2022 | Srinivasan | G06F 16/24578 |
| 2022/0293107 A1* | 9/2022 | Leaman | G06F 16/2428 |

FOREIGN PATENT DOCUMENTS

| | | |
|---|---|---|
| JP | 202038510 A | 3/2020 |
| JP | 202071679 A | 5/2020 |

* cited by examiner

FIG. 4

User information database 281

| User ID | Name | Age | Gender | Place of residence | Industry type | Commercial area | Website URL | Remarks | ... |
|---|---|---|---|---|---|---|---|---|---|
| U001 | A | 20 | M | Tokyo | Hairdresser | Ward A | https://**** | - | ... |
| U002 | B | 30 | F | Shizuoka | Building industry | Ward B | https://++++ | - | ... |
| U003 | C | 40 | M | Saitama | Barber | City A | https://··· | - | ... |
| U004 | D | 50 | M | Chiba | Hairdresser | City C | https://*** | - | ... |
| ... | ... | ... | ... | ... | ... | ... | ... | ... | ... |

Word information database 282

| Word | Word type | Related words | Remarks | ... |
|---|---|---|---|---|
| Hairdresser | Industry type/job type | Beauty parlor, clean, inexpensive, recommended, ... | - | ... |
| Beauty parlor A | Service/product | Beauty parlor A, City A, recommended, costs, ... | - | ... |
| City A | Commercial area | Close to station, recommended, new, ... | - | ... |
| Handsome | Related words | Cool, cute, hairdresser, clerk, ... | - | ... |
| ... | ... | ... | ... | ... |

Registered word database 283

| User ID | Registered word ID | Words (industry type) | Words (region) | Related words | Created article contents | Remarks | ... |
|---|---|---|---|---|---|---|---|
| U001 | UW001-1 | Beauty parlor, beauty industry, hairdresser, ... | Tokyo, ward A, city B, ... | Clean, inexpensive, recommended, ... | https://**** https://++++ | - | ... |
| | UW001-2 | Barbershop, barber's, ... | Saitama, city B, ... | Recommended, skilled, ... | https://**** | | |
| | ... | ... | ... | ... | ... | | |
| U002 | UW002-1 | remodeling, building industry, ... | Shizuoka, ward B, city C, ... | Skillful, recommended, costs, ... | https://*** | - | ... |
| U003 | UW003-1 | Barbershop, barber, ... | Saitama, city C, ... | Cost performance, recommended, careful, ... | https://+++ https://*** | - | ... |
| ... | ... | ... | ... | ... | ... | ... | ... |

INFORMATION PROCESSING APPARATUS AND METHOD

CROSS-REFERENCE TO RELATED APPLICATION

This application is a Continuation Application of No. PCT/JP2022/12257, filed on Mar. 17, 2022, and the PCT application is based upon and claims the benefit of priority from Japanese Patent Application No. 2021-088053, filed on May 26, 2021, the entire contents of which are incorporated herein by reference.

FIELD

The present disclosure relates to an intonation processing apparatus and method.

BACKGROUND

There is known a technique for assisting in effectively performing search engine optimization (SEO) based on messages exchanged in a predetermined format.

Japanese Patent Application Publication No. 2020-38510 discloses an information processing apparatus comprising: a conversation log acquiring means for acquiring, in a conversation system, conversation data including contents of a conversation exchanged by conversation targets including one or more natural persons; an attribute acquiring means for acquiring, as attribute information, information about attributes of one or more natural persons among the conversation targets relating to the conversation data; a process acquiring means for acquiring, as process information, information about a process of the conversation relating to the conversation data; and a converting means for processing all or part of the data relating to the conversation of each of the one or more natural persons among the conversation data based on the acquired attribute information and process information, and converting the processed data into a predetermined format.

Japanese Patent Application Publication No. 2020-38510 describes a technique for creating a web page that allows the user to effectively obtain an SEO effect based on message exchanges with a chatbot in a conversation system.

However, in the technique of Japanese Patent Application Publication No. 2020-38510, a web page is created based on messages exchanged with a chatbot; therefore, creation of an article content based on words received from a user is not considered. Therefore, the user needs to exchange a message a plurality of times in order to create an article content, which may discourage the user from creating an article content.

Therefore, there is a need for a technique capable of more easily creating an SEO-conscious article content of a blog or the like based on information of words or the like received from the user.

BRIEF DESCRIPTION OF THE DRAWINGS

FIG. 4 shows data structures of a user information database (DB) and a word information DB stored in a storage unit of the server 20.

DETAILED DESCRIPTION

Figure 1:
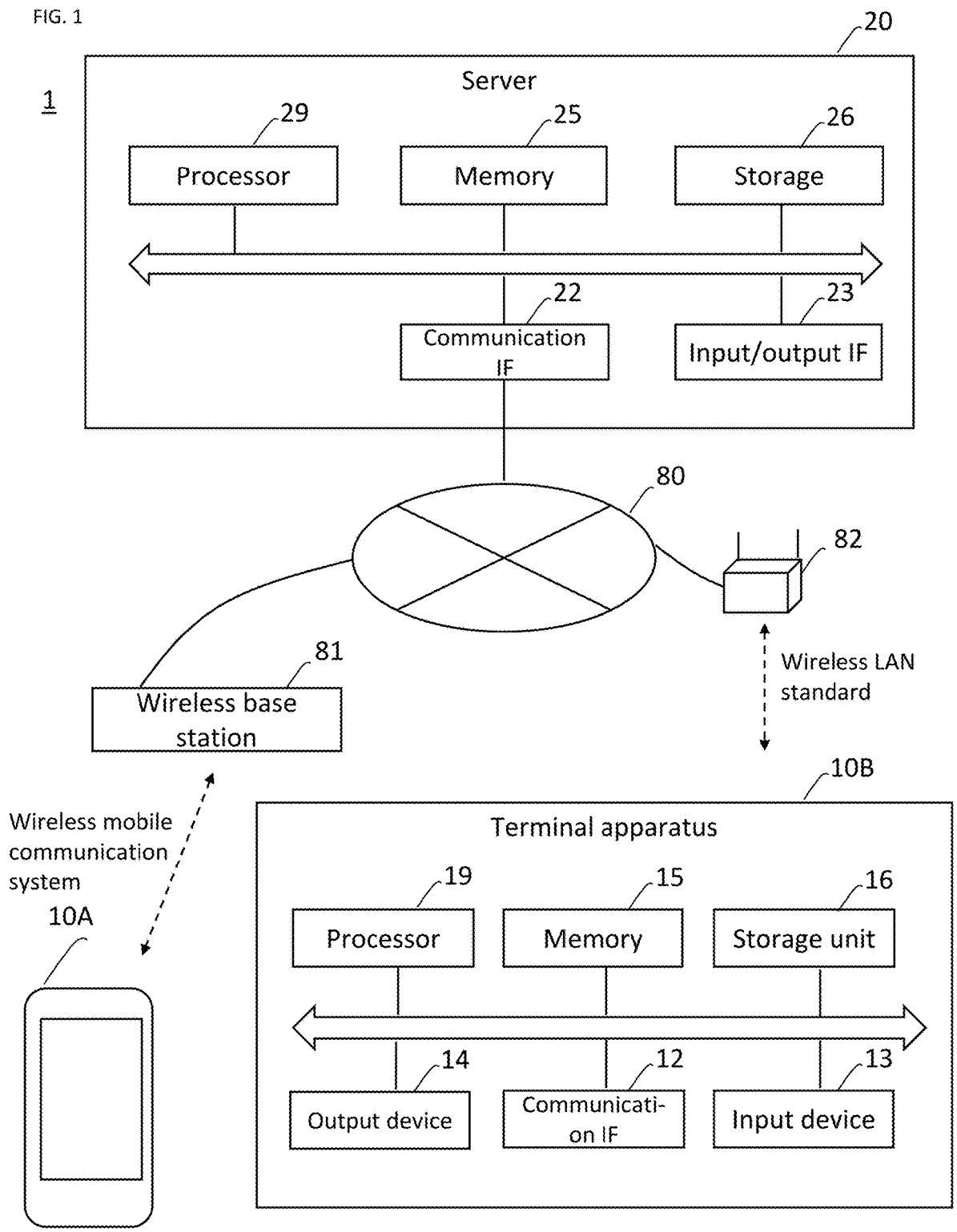
FIG. 1 is a block diagram showing an overall configuration of a system 1.

Hereinafter, embodiments of the present invention will be described with reference to the drawings. In the following description, identical parts are denoted by the same reference numeral. Their names and functions are also the same. Therefore, their detailed descriptions will not be repeated.

According to one embodiment, there is provided a program executed by a computer comprising a processor and a memory, wherein the computer stores in a storage unit a trained model generated by training using as training data one or more types of words and a result of searching the Internet with a search engine using one or more types of words as a search query, the trained model receives, as an input, designated words which are words designated by a user, and thereby outputs an article content, and the program causes the processor to execute: receiving an input of at least a first word and a second word different from the first word as first designated words; and outputting a first article content corresponding to the received first designated words, based on the received first word and second word and the trained model.

First Embodiment

Overview

The following embodiment describes a technique for creating an SEO-conscious article content in response to receiving one or more types of words from a user in a system for the user to create an article content.

A system for creating an article content creates an article content by combining words received from a user. When an article content such as a blog article is created in the system, the article content may lack accuracy as sentences and give an unnatural impression to the reader. In addition, when a user operates a predetermined website and wishes to induce access to the website through an article content, if the reader considers that the article content has been automatically created by a machine, the article content may not lead to access to the website. Moreover, when a user manually creates an article content, it is difficult to create an article content while understanding what search tams other users use for search, and the user may not be able to create an SEO-conscious article content.

Therefore, in the system 1, there is provided a program executed by a computer comprising a processor and a memory, wherein the computer stores in a storage unit a trained model generated by training using as training data one or more types of words and a result of searching the Internet with a search engine using the one or more types of words as a search query, the trained model receives a designated word which is a word designated by a user, and thereby outputs an article content, and the program causes the processor to execute: receiving an input of at least a first word and a second word different from the first word as first designated words; and outputting a first article content corresponding to the received first designated words, based on the received first word and second word and the trained model.

The system 1 can be used, for example, by applications, software, etc. for creating article contents that users install on their own terminal apparatuses. According to the present disclosure, users can easily create SEO-conscious article contents.

1 Configuration Diagram of Entire System

FIG. 1 shows an overall configuration of the system 1 in a first embodiment.

As shown in FIG. 1, the system 1 includes a plurality of terminal apparatuses (terminal apparatus 10A and terminal apparatus 10B are shown in FIG. 1; hereinafter sometimes collectively referred to as a "terminal apparatus 10") and a server 20. The terminal apparatus 10 and the server 20 are connected to communicate via a network 80.

The terminal apparatus 10 is an apparatus operated by each user. The terminal apparatus 10 is realized by a mobile terminal or the like, such as a smartphone or a tablet, compatible with a mobile communication system. Alternatively, the terminal apparatus 10 may be, for example, a stationary personal computer (PC) or a laptop PC. As shown in FIG. 1 as the terminal apparatus 10B, the terminal apparatus 10 includes a communication interface (IF) 12, an input device 13, an output device 14, a memory 15, a storage unit 16, and a processor 19. The server 20 includes a communication IF 22, an input/output IF 23, a memory 25, a storage 26, and a processor 29.

The terminal apparatus 10 is communicatively connected to the server 20 via the network 80. The terminal apparatus 10 is connected to the network 80 by communicating with a wireless base station 81 compatible with predetermined communication standards such as 5G and Long Term Evolution (LTE), and a communication device, such as a wireless local area network (LAN) router 82, compatible with wireless LAN standards such as Institute of Electrical and Electronics Engineers (IEEE) 802.11.

The communication IF 12 is an interface for the terminal apparatus 10 to input and output signals for communication with an external apparatus. The input device 13 is an input device (such as a touch panel, a touch pad, a pointing device such as a mouse, or a keyboard) for receiving an input operation from the user. The output device 14 is an output device (such as a display or a speaker) for presenting information to the user. The memory 15 is used to temporarily store a program, data to be processed by the program, etc., and the like, and is a volatile memory such as a dynamic random access memory (DRAM). The storage unit 16 is a storage device for storing data, and is, for example, a flash memory or a hard disc drive (HDD). The processor 19 is hardware for executing an instruction set described in a program, and is composed of an arithmetic unit, a register, a peripheral circuit, and the like.

The server 20 manages information related to a user from whom an input operation for creating an article content is received. The server 20 stores various types of information such as age, gender, occupation, and commercial area of the user.

The communication IF 22 is an interface for the server 20 to input and output signals for communication with an external apparatus. The input/output IF 23 functions as an interface with an input device for receiving an input operation from the user and an output device for presenting information to the user. The memory 25 is used to temporarily store a program, data to be processed by the program, etc., and the like, and is a volatile memory such as a dynamic random access memory (DRAM). The storage 26 is a storage device for storing data, and is, for example, a flash memory or a hard disc drive (HDD). The processor 29 is hardware for executing an instruction set described in a program, and is composed of an arithmetic unit, a register, a peripheral circuit, and the like.

In the present embodiment, the apparatuses (terminal apparatus, server, etc.) can also be understood as an information processing apparatus. That is, an aggregation of apparatuses can be understood as one "information processing apparatus", and the system 1 may be famed as an aggregation of a plurality of apparatuses. How to distribute a plurality of functions required to realize the system 1 according to the present embodiment to one or more hardware apparatuses can be determined as appropriate in consideration of the processing capability of each hardware apparatus and/or the specifications required for the system 1.

1.1 Configuration of Terminal Apparatus 10

Figure 2:
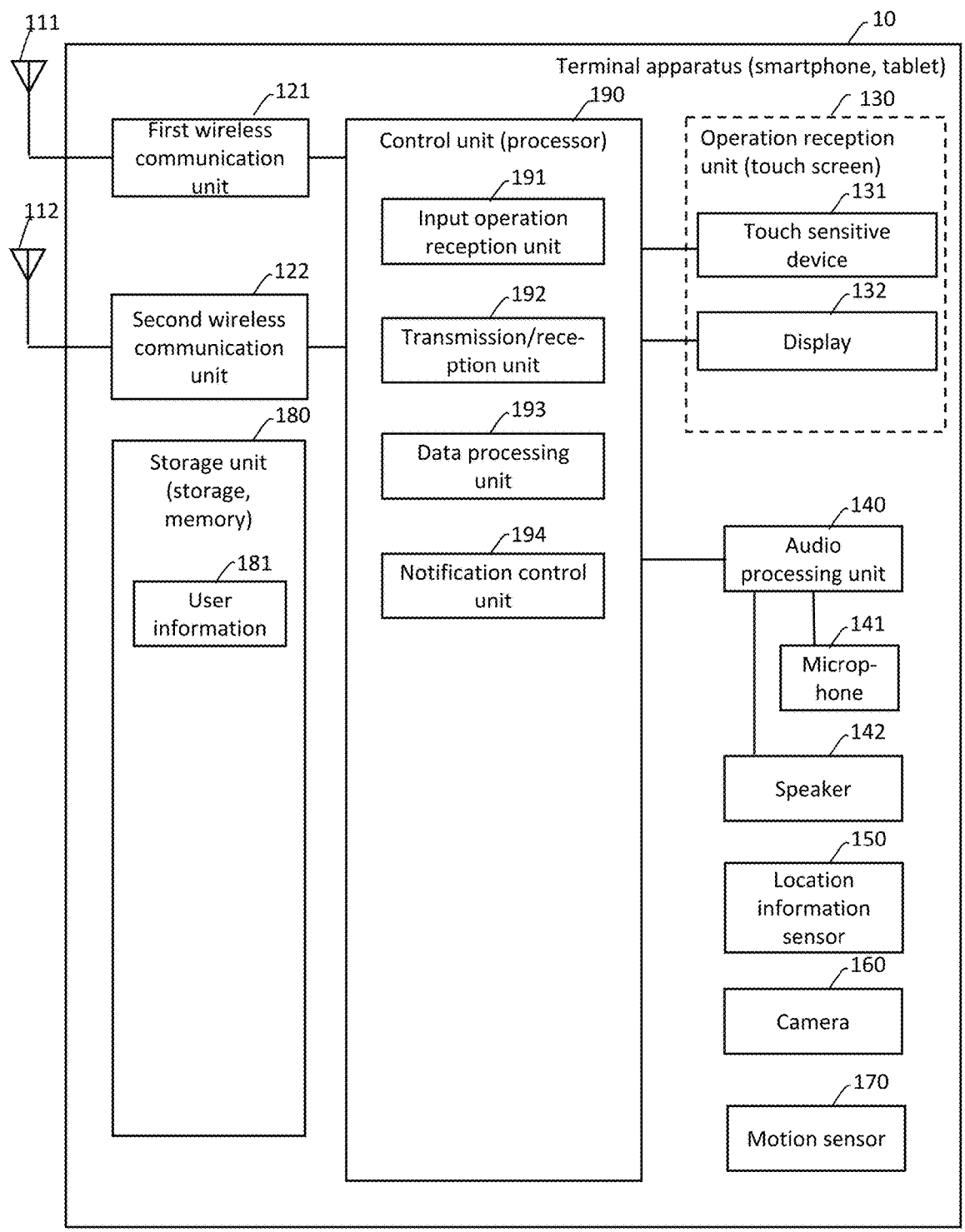
FIG. 2 shows a functional configuration of a terminal apparatus 10.

FIG. 2 is a block diagram of the terminal apparatus 10 constituting the system 1 of the first embodiment. As shown in FIG. 2, the terminal apparatus 10 includes a plurality of antennas (antenna 111 and antenna 112), wireless communication units (first wireless communication unit 121 and second wireless communication unit 122) corresponding to the respective antennas, an operation reception unit 130 (including a touch sensitive device 131 and a display 132), an audio processing unit 140, a microphone 141, a speaker 142, a location information sensor 150, a camera 160, a motion sensor 170, a storage unit 180, and a control unit 190. The terminal apparatus 10 also has functions and configurations not particularly shown in FIG. 2 (such as a battery for holding electric power, and a power supply circuit for controlling supply of electric power from the battery to each circuit). As shown in FIG. 2, the blocks included in the terminal apparatus 10 are electrically connected by buses or the like.

The antenna 111 radiates a signal emitted from the terminal apparatus 10 as a radio wave. The antenna 111 also receives a radio wave from the space and provides the received signal to the first wireless communication unit 121.

The antenna 112 radiates a signal emitted from the terminal apparatus 10 as a radio wave. The antenna 112 also receives a radio wave from the space and provides the received signal to the second wireless communication unit 122.

The first wireless communication unit 121 performs modulation/demodulation processing or the like for transmitting and receiving a signal through the antenna 111 to allow the terminal apparatus 10 to communicate with another wireless apparatus. The second wireless communication unit 122 performs modulation/demodulation processing or the like for transmitting and receiving a signal through the antenna 112 to allow the terminal apparatus 10 to communicate with another wireless apparatus. The first wireless communication unit 121 and the second wireless communication unit 122 are communication modules including a tuner, a received signal strength indicator (RSSI) calculation circuit, a cyclic redundancy check (CRC) calculation circuit, a high frequency circuit, and the like. The first wireless communication unit 121 and the second wireless communication unit 122 pertain a modulation/demodulation or a frequency conversion of a radio signal transmitted or received by the terminal apparatus 10 and provides the received signal to the control unit 190.

The operation reception unit 130 has a mechanism for receiving an input operation by the user. Specifically, the operation reception unit 130 is configured as a touch screen and includes the touch sensitive device 131 and the display 132. The touch sensitive device 131 receives an input operation by the user of the terminal apparatus 10. The touch sensitive device 131 detects a contact position of the user on the touch panel using, for example, a capacitive touch panel. The touch sensitive device 131 outputs a signal indicating the contact position of the user detected by the touch panel to the control unit 190 as an input operation.

The display 132 displays data such as an image, a moving image, and text in accordance with control of the control unit 190. The display 132 is realized by, for example, a liquid crystal display (LCD) or an organic electro-luminescence (EL) display.

The audio processing unit 140 modulates and demodulates an audio signal. The audio processing unit 140 modulates a signal provided by the microphone 141 and provides the modulated signal to the control unit 190. The audio processing unit 140 also provides an audio signal to the speaker 142. The audio processing unit 140 is realized by, for example, a processor for audio processing. The microphone 141 receives an audio input and provides an audio signal corresponding to the audio input to the audio processing unit 140. The speaker 142 converts the audio signal provided from the audio processing unit 140 into audio and outputs the audio to the outside of the terminal apparatus 10.

The location information sensor 150 is a sensor for detecting the location of the terminal apparatus 10, and is, for example, a global positioning system (GPS) module. The GPS module is a receiver device used in a satellite positioning system. The satellite positioning system receives signals from at least three or four satellites, and detects the current location of the terminal apparatus 10 equipped with the GPS module based on the received signals. The location information sensor 150 may be a transmission/reception device based on a communication standard used in a short-range communication system for communication between information devices. Specifically, the location information sensor 150 is equipped with a Bluetooth (registered trademark) module or the like which uses a 2.4 GHz band and receives a beacon signal from another information device equipped with a Bluetooth (registered trademark) module.

The camera 160 is a device for receiving light by a light receiving element and outputting it as a captured image. The camera 160 is, for example, a depth camera capable of detecting a distance from the camera 160 to an object to be imaged.

The motion sensor 170 is constituted by a gyro sensor, an acceleration sensor, etc., and detects the tilt of the terminal apparatus 10.

The storage unit 180 is constituted by, for example, a flash memory or the like, and stores data and programs used by the terminal apparatus 10. In one aspect, the storage unit 180 stores user information 181.

The user information 181 includes information such as age, gender, occupation, and commercial area of the user. The terminal apparatus 10A may create an article content based on the user information. However, the registration of such information itself is not essential, and an article content may be created by receiving registration of various types of information from the user every time.

The control unit 190 controls the operation of the terminal apparatus 10 by reading a program stored in the storage unit 180 and executing instructions included in the program. The control unit 190 is, for example, an application processor. The control unit 190 operates in accordance with the program to perform the functions as an input operation reception unit 191, a transmission/reception unit 192, a data processing unit 193, and a notification control unit 194.

The input operation reception unit 191 performs a process of receiving an input operation by the user on an input device such as the touch sensitive device 131. The input operation reception unit 191 determines the type of the operation, such as whether the user's operation is a flick operation, a tap operation, or a drag (swipe) operation, based on information on the coordinates at which the user touches the touch sensitive device 131 with a finger or the like.

The transmission/reception unit 192 performs a process by which the terminal apparatus 10 transmits and receives data to and from an external apparatus such as the server 20 in accordance with a communication protocol.

The data processing unit 193 performs a process of performing an arithmetic operation on data received by the terminal apparatus 10 in accordance with a program, and outputting an operation result to a memory or the like.

The notification control unit 194 performs a process of causing the display 132 to display a display image, a process of causing the speaker 142 to output audio, and a process of generating vibration on the camera 160.

1.2 Functional Configuration of Server 20

Figure 3:
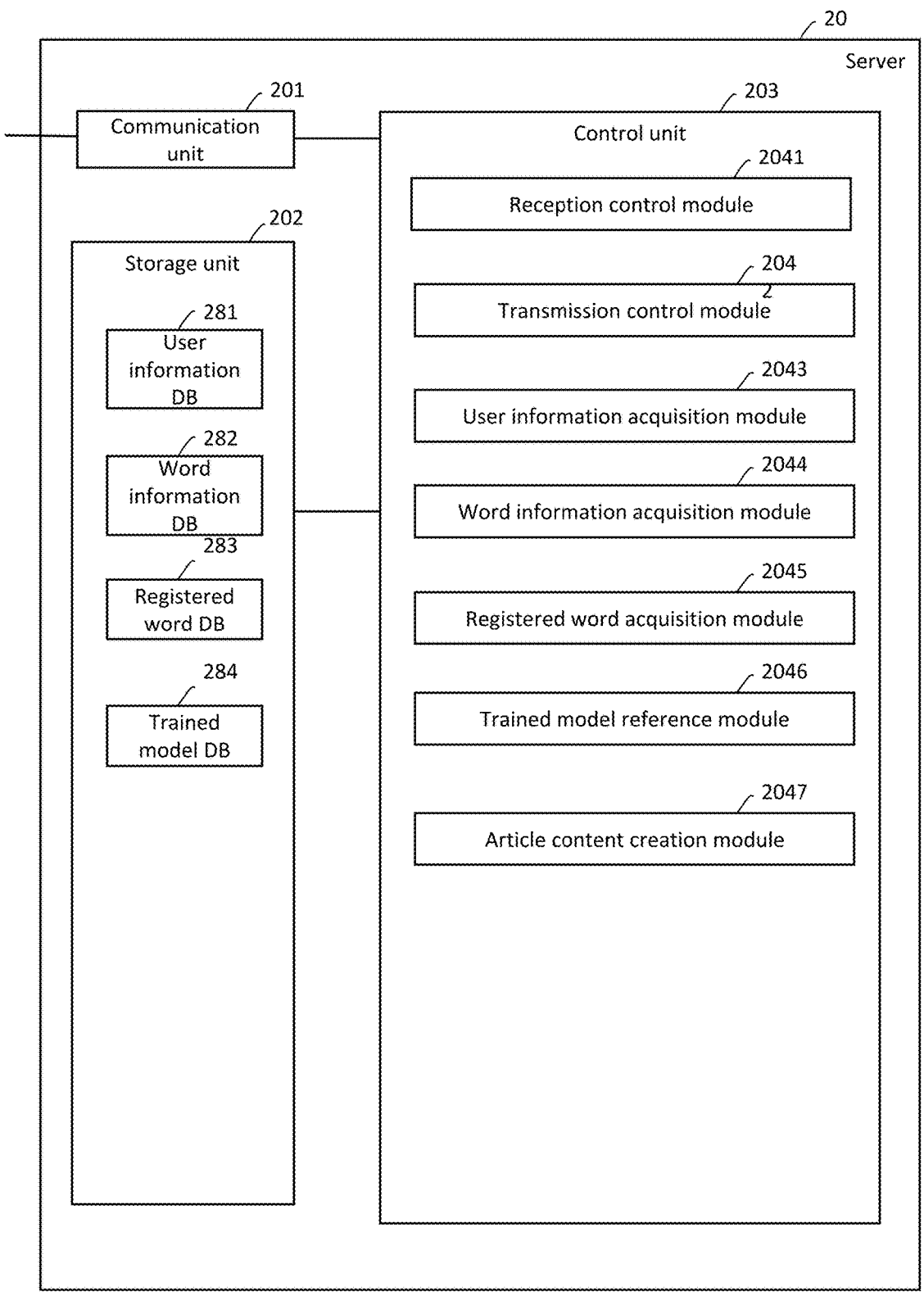
FIG. 3 shows a functional configuration of a server 20.

FIG. 3 shows a functional configuration of the server 20. As shown in FIG. 3, the server 20 performs functions as a communication unit 201, a storage unit 202, and a control unit 203.

The communication unit 201 performs a process by which the server 20 communicates with an external apparatus.

The storage unit 202 stores data and programs used by the server 20. The storage unit 202 stores a user information database 281, a word information database 282, a registered word database 283, a trained model database 284, and the like.

The user information database 281 is a database for holding various types of information about each user. Details will be described later.

The word information database 282 is a database for holding various types of information about words referred to when an article content is created. Details will be described later.

The registered word database 283 is a database for holding various types of information about words registered in advance by a user who creates an article content. Details will be described later.

The trained model database 284 is a database for managing information of a trained model (first trained model) in which one or more types of words and a result of searching the Internet with a search engine using one or more types of words as a search query are associated as training data. An example of a method for creating a trained model will be described below. For example, the server 20 receives information of words that serve as a base of an article content from a user provided with the system 1. At this time, the words received from the user include, for example, the following words:

- words indicating commercial areas or the like of the user who creates an article content;
- words indicating occupations/job types of the user who creates an article content;
- words indicating products/services provided by the user who creates an article content;
- words describing or modifying the commercial area of the user who creates an article content;

words describing or modifying the occupation/job type of the user who creates an article content; and words describing or modifying the product/service provided by the user who creates an article content.

Here, the words describing or modifying the commercial area of the user who creates an article content, the occupation/job type of the user who creates an article content, or the product/service include, for example, the following:

words indicating convenience of use, such as "close to a station", "far from a station", or "XX minutes on foot";

words indicating evaluation, etc. of the occupation/job type, product/service, etc. of the user who creates an article content, such as "skilled", "inexpensive", and "good atmosphere"; and words relating to evaluation of persons engaged in the occupation/job type, product/service, etc. provided by the user who creates an article content, such as "cool", "cute", and "nice".

The server 20 searches the Internet using information of such words as a search query, and associates information of an article content included in the acquired search result with the information of the words. Based on the information of the words received from the user and the trained model, the server 20 generates an article content corresponding to the received words and outputs the article content to the user.

In one aspect, the server 20 may receive information of further words that serve as a source of an article content from the user who creates the article content, and may update the trained model by executing the above-described process.

In one aspect, the server 20 may hold, as training data for creating a trained model, the information of the acquired article content in the storage unit as it is or after executing a specific process on the information. Here, the specific process may be, for example, a process in which the server 20 searches the Internet using the aforementioned search query and generalizes the content of the article content included in the acquired search result. Here, the process of generalizing the sentences included in the article content refers to a process of deleting the proper nouns and colloquial expressions included in the words included in the acquired article content, the words originally created by the user who created the article content, the sentence expressions such as phrases originally created, and the like, and creating sentences composed of words and expressions used in general with reference to the word information database 282. When the server 20 receives words from the user who creates an article content, refers to the trained model, and outputs an article content, the server 20 uses the cosine similarity, the Euclidean distance, or the like to create an article content that is separated from an article content group held in the database by a predetermined range with respect to the distance between sentences included and the similarity between words included. This allows the user to create an article content unique to the user since the user does not use the sentences, words, and the like included in the article content group in the database as they are. In addition, this allows the user to create an article content after determining the distance between sentences or the like, and thus create an article content composed of natural sentence expressions.

Further, the training data used by the server 20 to create the trained model is not limited to the information of the article content included in the search result obtained by searching the Internet as described above. For example, the server 20 may use, as training data, information of an article content created by a user who uses the system 1.

In one aspect, the server 20 may obtain training data that takes into account a seasonal factor as training data used when a trained model is created. For example, when a user attempts to create an article content to look back on an event that occurred in the past after many years have passed, the top searched article content at the most recent time may include words relating to impressions at that time here and there, and words expressing the situation at that time may not be able to be extracted. When the server 20 creates an article content about an event that occurred in the past, the server 20 may use, as training data, information published on the Internet at the time when the event occurred in the past. This allows the user to create an original article content of an event that occurred in the past, even after time has passed from the time when the event occurred, in a manner referring to the expressions used at that time.

Further, the number of types of the trained models held in the storage unit 202 by the server 20 is not limited to one. The server 20 may manage information of a second trained model in which an article content and a result of accesses by a second user (such as a customer) who has accessed the article content to a website managed by the user are associated as training data. In one aspect, the server 20 may present to the user a result of prediction, based on the aforementioned trained model (defined as a first trained model) and the second trained model, as to whether a customer who has accessed the article content will access the website managed by the user, along with the article content. At this time, the server 20 may present the prediction result to the user as a graph.

This allows the user to predict the number of accesses to the website at the same time as creating the article content, thereby enabling creation of an effective article content.

A reception control module 2041 controls a process by which the server 20 receives a signal from an external apparatus in accordance with a communication protocol.

A transmission control module 2042 controls a process by which the server 20 transmits a signal to an external apparatus in accordance with a communication protocol.

A user information acquisition module 2043 acquires various types of information about a user from whom an input operation for creating an article content is received.

A word information acquisition module 2044 acquires various types of intonation about words to be referred to when an article content is created.

A registered word acquisition module 2045 acquires various types of information about words registered by the user who creates an article content.

A trained model reference module 2046 refers to the first trained model or the second trained model, based on information of the words received from the user.

An article content creation module 2047 creates, based on the words received from the user and the trained model, an article content corresponding to the received words.

2 Data Structure

FIG. 4 shows data structures of the user intonation database 281 and the word information database 282 stored in the server 20.

As shown in FIG. 4, the user information database 281 includes an item "user ID", an item "name", an item "age", an item "gender", an item "place of residence", an item "industry type", an item "commercial area", an item "website URL", and an item "remarks".

The item "user ID" is information for identifying each user.

The item "name" indicates intonation about the name of each user. For example, the name of the user with the user ID "U001" is "A".

The item "age" indicates information about the age of each user. For example, the age of the user with the user ID "U001" is "20".

The item "gender" indicates information about the gender of each user. For example, the gender of the user with the user ID "U001" is "M (male)".

The item "place of residence" indicates information about the place of residence of each user. For example, the place of residence of the user with the user ID "U001" is "Tokyo".

The item "industry type" indicates information about the industry type of each user. Specifically, the industry types of the user include the following:
- beauty industry such as hairdressers and barbers;
- food service industry such as restaurants and cafes;
- professional service industry such as lawyers and patent attorneys;
- transportation industry such as warehousing and transportation;
- waterworks industry;
- civil engineering industry;
- building and construction industry;
- manufacturing industry;
- medical industry;
- welfare industry; and
- therapeutic industry.

The industry type of each user is not limited to these, and may be any type of industry.

For example, the industry type of the user with the user ID "U001" is "hairdresser". In one aspect, the server 20 may identify information of words or the like to be included in the article content, based on information of the occupation. For example, the server 20 may identify information of words relating to customer attraction as information to be included in the article content. The information of words relating to customer attraction includes, for example, the following information:
- information related to the appearance of the user or employees employed by the user (cool, cute, etc.);
- information related to the skills and abilities of the user or employees employed by the user (good, good quality, etc.);
- information about services provided (required time, content, etc.);
- information about stores (distance and time from station, etc.); and
- information about fees (high, low, fee for each service, etc.) This allows the user to include words related to his/her occupation, which customers are likely to search for, in the article content and thereby expect an improvement in the effectiveness of the article content in attracting customers.

The above words may be held in the database by receiving an input operation for registering each word from the user.

The item "commercial area" indicates information about the commercial area of each user. Specifically, the item "commercial area" is information about a range in which the user operates a business. In one aspect, the server 20 may identify information of words or the like to be included in the article content, based on information of the commercial area. The information of words based on the commercial area includes the following:
- information of services, etc. for limited regions/districts; and
- information of other stores, etc. in regions/districts.

For example, the occupation of the user with the user ID "U001" is "ward A". In one aspect, the server 20 may acquire information of events or the like related to the commercial area and identify the information as words to be included in the article content. This allows the user to create an effective blog article based on his/her own commercial area and information of events taking place in his/her own commercial area.

The above words may be held in the database by receiving an input operation for registering each word from the user.

The item "website URL" indicates information about a website/web server operated and managed by the user. Specifically, the item "website URL" includes the URLs of the following websites or web servers:
- URL of the website (HP) of the company or the like to which the user belongs;
- URL of a new product or new service of the company or the like to which the user belongs; and
- URL of a predetermined web server for posting a created article content.

In one aspect, based on information of a website URL, the server 20 may describe information of the website in created article content. In addition, based on information of a website URL, the server 20 may post and publish to the viewers the created article content on the website URL.

The item "remarks" indicates information when the user has special remarks. Specifically, the item "remarks" includes information such as that the user is about to launch a new product, or that the user is planning to present a new product at an exhibition. The server 20 may receive the information of the remarks through an input operation from the user, or may acquire the information by synchronizing with information of a calendar or the like published by the user on the Internet or the like. The server 20 may identify, based on the information, information of words to be included in the article content. This allows the user to announce a new product to the outside world as an article content without delay in a scene such as an announcement of a new product.

As shown in FIG. 4, the word information database 282 includes an item "word", an item "word type", an item "related words", and an item "remarks".

The item "word" indicates intonation of the name of each word held in the storage unit. Specifically, the words include the following information of words:
- words indicating general names (for example, a beauty parlor);
- words indicating proper names such as service names or product names (beauty salon A, etc.);
- words indicating names of commercial areas or regions (Tokyo, City A, etc.); and
- words describing or modifying words (beautiful, cool, cute, etc.).

The item "word type" indicates information about the type of the word held. Specifically, the information is information for identifying whether the word is a word relating to an occupation/job type, a word relating to a commercial area, or the like. For example, the word type of the word "hairdresser" is "industry type/job type".

The item "related words" indicates information of words associated with each word. Specifically, it indicates synonyms of each word, words describing each word, and the like. For example, when the word is "hairdresser", the related words may be "beauty salon, recommended", or the like.

The word information database 282 may be created by the server 20 acquiring information from an existing dictionary or the like. In one aspect, the server 20 may register the information of related words by receiving the information through an input operation from the user provided with the system 1.

The item "remarks" indicates information when there are special remarks for the information of the word.

As shown in FIG. 4, the registered word database 283 includes an item "user ID", an item "registered word ID", an item "words (industry type)", an item "words (region)", an item "related words", an item "created article contents", and an item "remarks".

The item "user ID" indicates information for identifying the user who has registered information of a group of words.

The item "registered word ID" indicates information for identifying the group of words registered by the user who creates an article content.

The item "words (industry type)" indicates information of words related to the industry type. Specifically, the item "words (industry type)" is a group of words indicating the type of industry in which the user who creates an article content is engaged. The number of words relating to each industry type is not limited to one. For example, when the user who creates an article content is a hairdresser, the words relating to the industry type include the following related words:
  hairdresser;
  beauty parlor;
  beauty salon; and
  hair salon.

The server 20 may store in the storage unit the word relating to the industry type in association with a plurality of other words, for example, information about the commercial area of the user who creates an article content. The server 20 may refer to a trained model and output an article content upon receiving an input of words from the user who creates an article content.

The item "words (region)" indicates information of words related to a region that is the commercial area of the user who creates an article content. Specifically, the item "words (region)" is a group of words relating to a region that is the commercial area of the user who creates an article content. For example, the words relating to the region that is the commercial area include the following words:
  words relating to prefectures;
  words relating to cities, wards, towns, and villages; and
  words relating to detailed addresses such as street numbers.

The server 20 can create an article content related to a region that is the commercial area of the user who creates an article content by inputting information about the commercial area and information about the industry type. This allows the user who creates an article content to create an article content that is likely to be a hit in searches by customers in a region that is the commercial area. This allows the user who creates an article content to create a SEO-conscious article content and thus prevent an opportunity loss.

The item "related words" indicates information of words describing or modifying each word. Specifically, the item "related words" is words describing or modifying a word of an industry type, a region, or the like when customers pertain a search act using a search engine on the Internet. For example, the related words include the following words that may be used in searching for various services, products, etc.:
  words relating to service skills, such as "skillful" and "good";
  words relating to prices, such as "inexpensive" and "expensive";
  words relating to the appearance of the service provider, such as "cool" and "cute";
  words relating to facilities, such as "clean" and "nice";
  words relating to the distance, such as "close" and "far"; and
  words relating to user evaluation, such as "recommended" and "safe".

The server 20 may receive an input of the information of the related words in addition to the words relating to the industry type and region and create an article content. This allows the user who creates an article content to create an article content taking into consideration words that customers may search for in relation to the industry type or the like.

The item "created article contents" indicates information of article contents created in the past by the user who creates an article content. Specifically, the item "created article contents" indicates details of the article contents created by the user who creates an article content using the system 1. Details of the article contents include, for example, the following:
  sentence information of each created article content; and
  information of the URL on the network where the created article content is disclosed.

In one aspect, the server 20 refers to the information when creating an article content. For example, the server 20 refers to the information upon receiving, from the user, information of registered words and receiving an input operation for creating an article content. When the server 20 finds an article content based on the registered words as a result of referring to the information, the server 20 may create an article content with a structure partially edited based on the found article content. For example, the server 20 modifies, based on the cosine similarity or the like, the original article content to include a sentences and words at a predetermined distance from sentences and words included in the original article content. Further, when the server 20 finds no article content corresponding to the registered words as a result of referring to the information, the server 20 may search the network, refer to an article content corresponding to the registered words, and create an article content by the same process as described above. Thereafter, the server 20 stores and updates the newly created content in the database. This allows the user to prevent creation of an article content having the completely same content and structure as a previously created article content since, each time an article content is created, information of the article content is accumulated in the database.

The item "remarks" indicates intonation when there are special remarks for information of the registered words.

In one aspect, when receiving registration of a word from the user who creates an article content, the server 20 may refer to the word information database 282, identify a word related to the word that the user is inputting, and present the identified word to the user. This allows the user to register words related to the word that the user is registering without omission, and efficiently create an article content.

In one aspect, the server 20 may hold a plurality of registered word IDs for one user who creates an article content. This allows the server 20 to determine, for example, based on which registered word ID the user who creates an article content should create an article content to increase accesses to the website managed by the user. Therefore, the server 20 can determine which combination of words is highly effective in guiding customers to the website, or the like.

3 Operation

A series of processes in which the system 1 receives words to be included in an article content and creates an article content based on the received words and a trained model will be described below.

Figure 5:
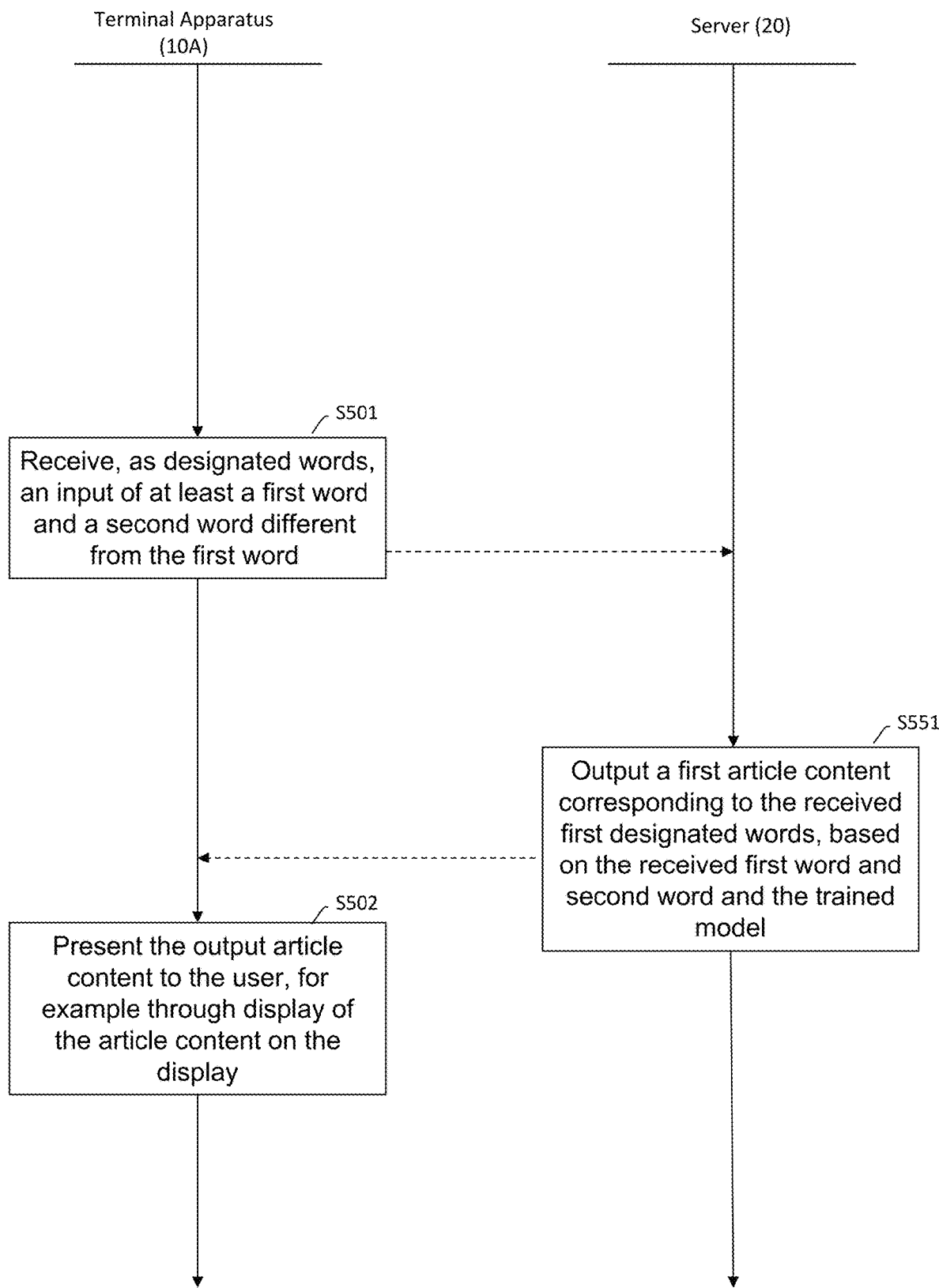
FIG. 5 is a flowchart showing a series of processes of receiving an input of words and outputting an article content.

FIG. 5 is a flowchart showing a series of processes in which the server 20 receives words to be included in an article content and creates an article content based on the received words and a trained model.

In step S501, the control unit 190 of the terminal apparatus 10A receives, as first designated words, an input of at least a first word and a second word different from the first word from the user. Specifically, the control unit 190 of the terminal apparatus 10A receives information of words to be used for an article content from the user who creates an article content. For example, the control unit 190 of the terminal apparatus 10A acquires information on a group of words registered in the registered word database 283 from the server 20, and presents the information to the user who creates an article content. The control unit 190 receives selection of words from the user. The control unit 190 transmits information of the received words to the server 20. Here, the control unit 190 of the terminal apparatus 10A does not necessarily have to receive the words through the input operation from the user who creates an article content. The control unit 190 may transmit an instruction relating to extraction of words to the server 20, and the control unit 203 of the server 20 may extract specific words from a group of words held in advance in the word information database 282. For example, the control unit 203 of the server 20 acquires information of the industry type or the like of the user who creates an article content from the terminal apparatus 10A. Thereafter, the control unit 203 refers to the word information database 282 and extracts words related to the industry type or the like of the user who creates an article content. The control unit 203 may output an article content based on the extracted words and the trained model. Here, the way of receiving words from the user who creates an article content is not limited. For example, the terminal apparatus 10A may receive an input of words from the user through a keyboard or the like, or may receive an input of spoken words through the microphone 141. Alternatively, the control unit 190 of the terminal apparatus 10A may receive an input of words through a virtual keyboard displayed on the display 132 or the like. The control unit 190 of the terminal apparatus 10A receives different words from respective groups of words including, for example, the following words:

words indicating a region that is the commercial area of the user;
words indicating the occupation/job type of the user;
words indicating services/products; and
words relating to the region, occupation/job type, services/products, and describing or modifying the region, occupation/job type, services/products, etc.

For example, the control unit 190 of the terminal apparatus 10A receives from the user words of different types from the above groups of words, such as a combination of commercial area+occupation/job type, a combination of commercial area+services/products, or a combination of occupation/job type+services/products. In one aspect, when a combination of words of different types is included, the control unit 190 of the terminal apparatus 10A may receive a plurality of words from a group of words of a single type. For example, the control unit 190 of the terminal apparatus 10A may receive a plurality of words having similar meanings among words indicating occupations/job types, such as "beauty salon+hairdresser+Tokyo". This allows the user to input words including orthographical variants and synonyms.

Specifically, the words describing or modifying regions, occupations/job types, services/products, etc. indicate words that customers, users, etc. input in association with the names of services, etc. when searching for the above information using search engines. For example, the words input in association with the names of services or the like include the following words:

words describing or modifying regions, such as "near", "far", and "XX minutes on foot";
words describing or modifying occupations/job types or services/products, such as "recommended", "inexpensive", and "delicious"; and
words describing or modifying persons engaged in the occupation/job type, service, etc.

Further, the control unit 190 of the terminal apparatus 10A may receive the aforementioned words from the user who creates an article content, then search for the words on the Internet, extract words included in top article contents of the search result, identify the words as words to be included in the article content, and transmit the identified words to the server 20.

The control unit 190 of the terminal apparatus 10A transmits information of the received words to the server 20.

In one aspect, the control unit 190 of the terminal apparatus 10A may receive a plurality of words describing or modifying a product or service that the organization to which the user belongs plans to newly release. This allows the user to create an article content relating to a release of a new service or product, or the like, and can appropriately disclose information of the new service or product.

In one aspect, a series of operations to extract the words may be performed by the control unit 203 of the server 20.

In step S551, the control unit 203 of the server 20 outputs a first article content corresponding to the received first designated words, based on the received first word and second word and the trained model. At this time, the control unit 203 of the server 20 may execute a search with a search engine using the received first word and second word as a search query. The control unit 203 of the server 20 may extract words with high frequency of appearance which are included in top search articles published on the Internet, and add the extracted words to the received words to create an article content. Specifically, the control unit 203 of the server 20 searches the Internet with a search engine using the received words as a search query, for example. At this time, the server 20 may preferentially refer to top search article contents among the article contents extracted as the search result, and extract information of words or the like included in the articles. This enables the user to create an article content including words that are related to the input words and that may rank high in searches. Alternatively, the server 20 may acquire information of words that are considered trending in social networking services (SNS), and create an article content based on the words and words related to the words. This allows the user to create an article content that will rank high in searches, and effectively promote, advertise, and publicize a product, a web page, or the like of the company of the user.

When the same user creates a plurality of blog articles, the server 20 may always use a different combination of groups of words from the groups of words included in the blog articles created in the past.

In one aspect, the control unit 203 of the server 20 may associate an article content with the number of accesses to the web page related to the article content. The server 20 may present an optimum combination of groups of words to the user, based on the groups of words included in an article content that has had a particularly great number of accesses among blog articles created in the past. The control unit 203 of the server 20 transmits the output article content to the terminal apparatus 10A.

In step S502, the control unit 190 of the terminal apparatus 10A presents the output article content to the user, for example through display of the article content on the display 132.

The control unit 190 of the terminal apparatus 10A may create an article content by two types of methods exemplified below:
  a method of automatically creating an article content in accordance with a preset schedule; and
  a method of creating an article content every time a word input is received from a user.

An example of the method of automatically creating an article content in accordance with a preset schedule will be described below. The control unit 190 of the terminal apparatus 10A receives an input operation of information about a schedule for creating article contents from the user. Here, with respect to the schedule, the number of times the software can be executed in a period of time, such as monthly or yearly, may be determined by a contract between the software provider and the user. At a set date and time, the control unit 190 of the terminal apparatus 10A automatically extracts words from the registered groups of words. At this time, the conditions under which the control unit 190 of the terminal apparatus 10A extracts words may be set in advance. The control unit 190 of the terminal apparatus 10A transmits the extracted words to the server 20. The control unit 203 of the server 20 executes the same steps as above to create an article content. The control unit 190 of the terminal apparatus 10A may present a screen for prompting the user to confirm the content after the article content is created and before the article content is published regardless of which of the above-described methods is used to create the article content. Specifically, the control unit 190 stores information of the temporarily created article content in the storage unit 180 of the terminal apparatus 10A, and causes the display 132 or the like of the terminal apparatus 10A to display the information of the article content. The control unit 190 may publish the article content in response to receiving an input operation for publishing the article content from the user. When an article content is automatically created, a series of operations for extracting words may be executed by the control unit 203 of the server 20. Specifically, when receiving an instruction to automatically create an article content from the user, the control unit 190 of the terminal apparatus 10A transmits information of a schedule for creating article contents to the server 20. Based on the received schedule, the control unit 203 of the server 20 may create an article content based on the information of words held in the storage unit 202 and the trained model.

This allows the user to automatically create an article content without extracting words or the like by himself/herself, so that the user can create an article content regularly even when the user is busy and has no time to create an article content.

4 Screen Example

Figure 6:
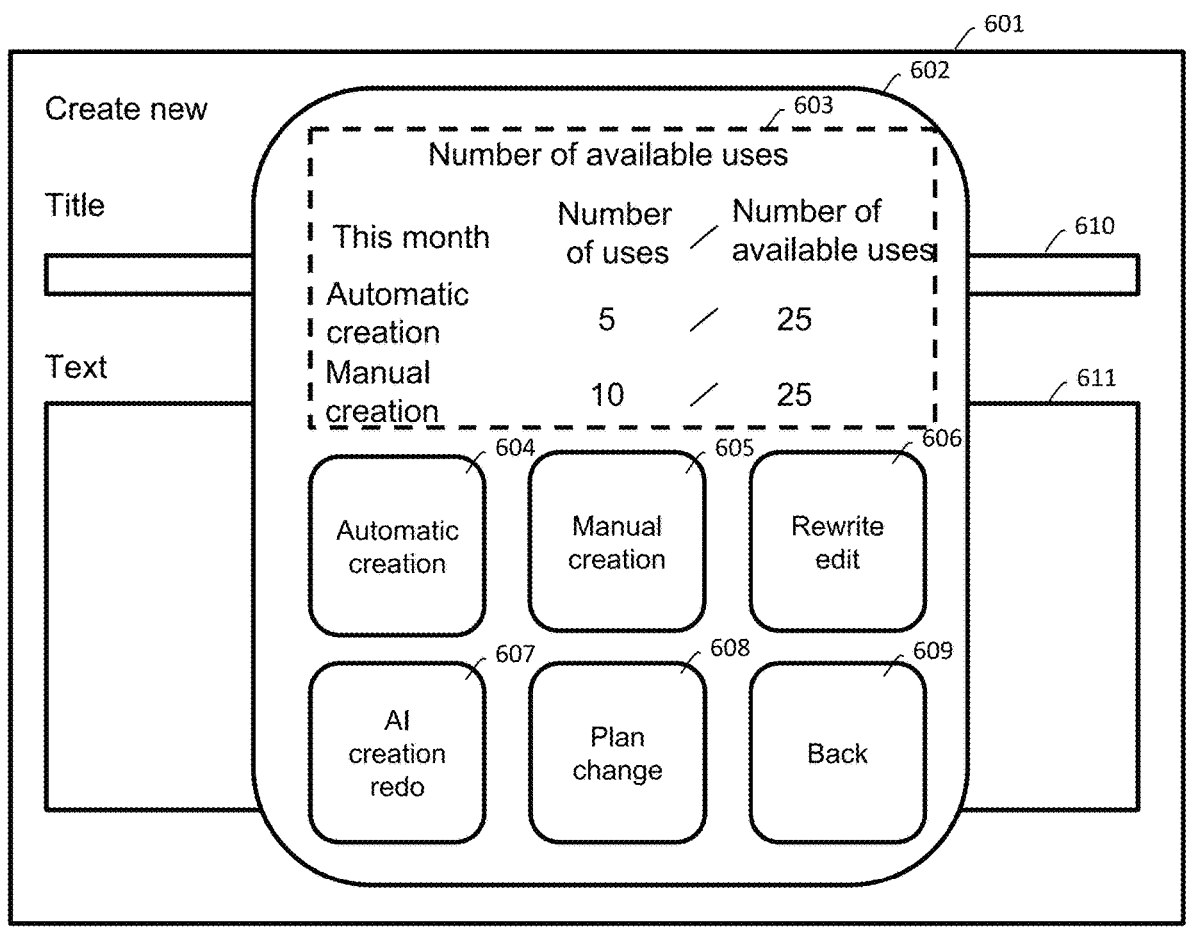
FIG. 6 is a screen example when an operation for creating an article content is received from a user.

FIG. 6 shows a screen example when an operation for creating an article content is received from the user. With reference to FIG. 6, a screen displayed on a display for a PC is described as an example, but the screen example is not limited to this, and screens may be displayed on a display of a terminal apparatus such as a smartphone. That is, the application exemplified in the present disclosure is not limited to software or an application for PCs, but may be an application for mobile terminals such as smartphones. The same applies to subsequent screen examples.

In FIG. 6, an article content creation screen 601 shows a screen for the terminal apparatus 10A to receive conditions or the like for creating an article content. The control unit 190 of the terminal apparatus 10A receives various operations from the user in a condition display area 602 to be described later, and creates an article content based on the received operation. In the following description of the screen example, it is assumed that the user has subscribed to a predetermined service for creating article contents. On the article content creation screen 601, a condition display area 602, an article content title field 610, and an article content text field 611 are displayed.

The condition display area 602 is an area for displaying information of a plan of a service to which the user has subscribed, information of buttons or the like used when the user creates an article content, etc. Specifically, in the condition display area 602, a user plan display area 603 shows information of a plan and the like of the service to which the user has subscribed. The information displayed in the area includes, for example, the following information:
  information of the plan of the service to which the user has subscribed; and
  creation status of article contents in the plan to which the user has subscribed.

The plan of the service to which the user has subscribed includes a plan for automatically creating an article content and a plan for manually creating an article content. Further, the terminal apparatus 10A may present to the user the usage status of the plan for creating an article content in that area.

An automatic creation button 604 is a button for setting conditions for automatically creating article contents. Specifically, when receiving an operation such as a click of the button from the user, the control unit 190 of the terminal apparatus 10A may present to the user a screen or the like for setting conditions for automatically creating article contents. The user inputs a schedule or the like for creating article contents to the presented screen. At this time, the user may input information of words to be extracted preferentially when an article content is automatically created. Further, when receiving the conditions from the user, the control unit of the terminal apparatus 10A may transmit the conditions to the server 20 to share the conditions for automatically creating article contents. The control unit 190 of the terminal apparatus 10A presents the article contents created based on the set schedule to the user.

The manual creation button 605 is a button for creating an article content based on a user's instruction. Specifically, when receiving an operation such as a click of the button from the user, the terminal apparatus 10A presents information about word candidates held in the storage unit 180 to the user. When receiving an input operation for selecting words from the user, the control unit 190 of the terminal apparatus 10A transmits information of the words to the server 20. The server 20 creates an article content based on the received words and the trained model, and transmits the article content to the terminal apparatus 10A. The control unit of the terminal apparatus 10A presents the received article content to the user.

A rewrite edit button 606 is a button for re-editing an already created article content. Specifically, when receiving an operation such as a click of the button from the user, the control unit 190 of the terminal apparatus 10A presents a screen for re-editing an article content created and published in the past to the user. On the screen for re-editing, the terminal apparatus 10A receives from the user an addition/ correction of information of words included in the article content. The control unit 190 of the terminal apparatus 10A transmits the added/corrected information of words to the server 20. The control unit 203 of the server 20 re-edits the article content based on the received information of words and the trained model, and transmits the edited article content to the terminal apparatus 10A.

In one aspect, the re-editing process may be executed without receiving an addition/editing of words included in the article content. That is, the control unit 203 of the server 20 re-searches the Internet using information of words included in an article content created in the past as a search query, updates information of top search articles, and adds information of words based on the updated information. The control unit 203 of the server 20 may re-edit the article content based on the added information of words and the trained model.

In one aspect, the control unit 203 of the server 20 may receive an input operation for manually creating an article content from the user. That is, the control unit 203 may receive an input operation of textual information from a keyboard or the like of the terminal apparatus 10A owned by the user to receive an input operation for creating an article content. Here, the input operation of textual information from the user is not limited, and the textual information may be input through the user's voice collected by the microphone 141 or the like. Then, the control unit 203 may search the Internet based on the created article content and present a display screen or the like requesting rewriting of the article to the user when there is a possibility that the article content infringes a copyright of another company. For example, in creation of an article content, the server 20 may present that display to the user when an article content similar to an article content published on the Internet has been created, or the like. This allows the user to prevent the risk of unknowingly infringing the copyrights of other companies.

An AI creation redo button 607 is a button for discarding a newly created article content before publication and recreating it. Specifically, when receiving an operation such as a click of the button from the user, the control unit 190 of the terminal apparatus 10A presents to the user a screen for discarding a newly created, pre-published article content and recreating it. At this time, the control unit 190 of the terminal apparatus 10A may display the words used when the article content was created to the user in a different faint. This allows the user to know on which words the article content was based before it was discarded.

A plan change button 608 is a button for changing the plan of the service to which the user has subscribed. Specifically, when receiving an operation such as a click of the button from the user, the control unit 190 of the terminal apparatus 10A presents to the user a screen for changing the plan of the service to which the user has subscribed.

Figure 7:
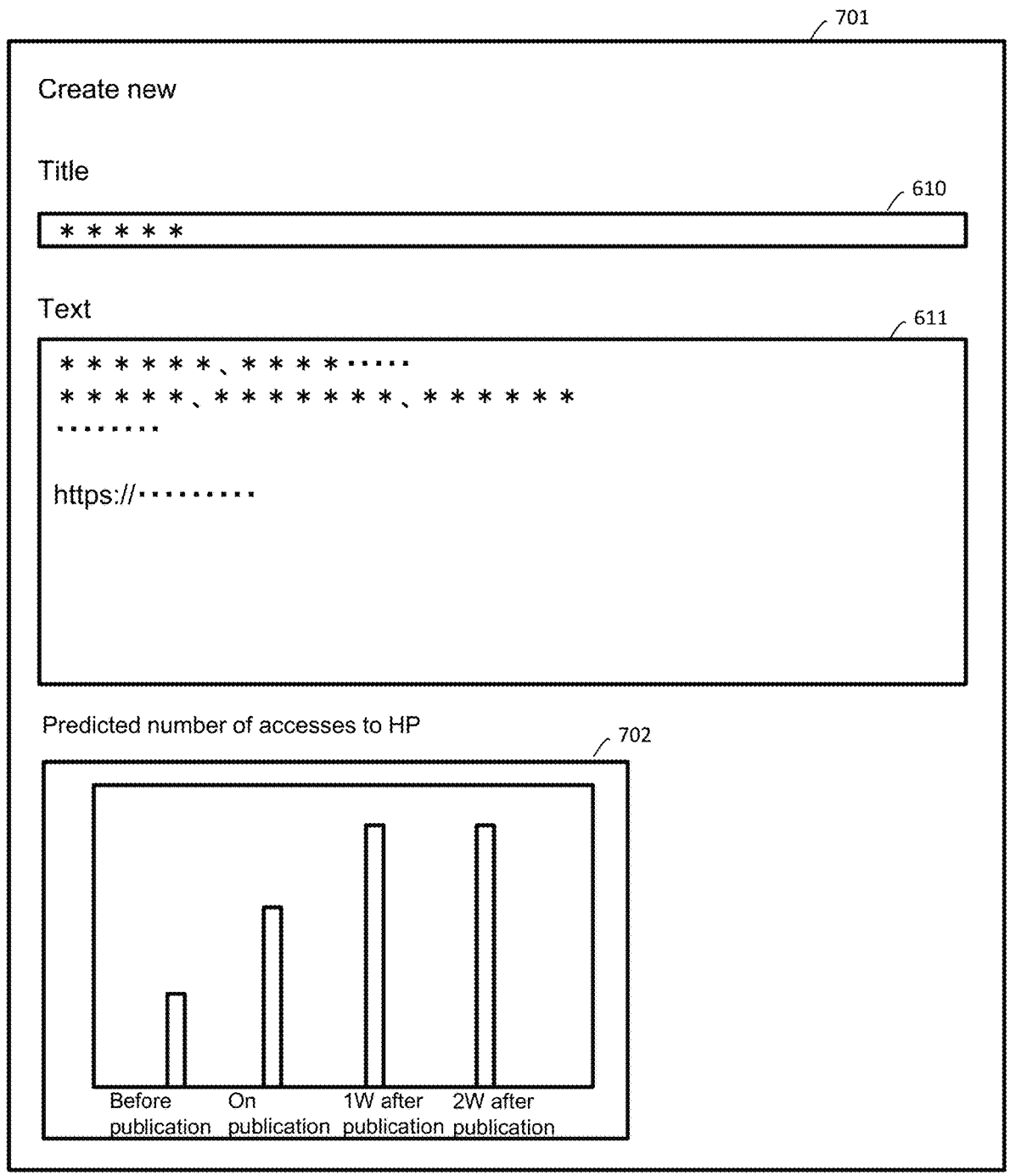
FIG. 7 is a screen example when both article content and prediction result of the number of accesses are presented.

FIG. 7 shows a screen example when the created article content is presented together with the prediction result of the number of accesses to the website managed by the user.

In FIG. 7, a display screen 701 is a screen for the control unit of the terminal apparatus 10A to display the created article content on the display 132 or the like.

On the display screen 701, an access prediction graph 702 shows a result of predicting the number of accesses by customers who have viewed the article content to a website or the like managed by the user. Specifically, the control unit 203 of the server 20 creates an article content and a graph showing a result of predicting the number of accesses by customers who have viewed the article content to the website or the like managed by the user, based on the received words, the first trained model, and the second trained model. The control unit 203 of the server 20 transmits the created article content and graph to the terminal apparatus 10A, and the control unit 190 of the terminal apparatus 10A causes the display 132 or the like to display the received article content and graph. Further, the terminal apparatus 10A may present to the user not only the prediction result of the number of accesses but also an illustration of the actual result of accesses by customers who have viewed the article content to the website or the like.

This allows the user to visualize, and predict and grasp the effect (advertising effect, promotional effect) of the article content.

5 Modification

A modification of the present embodiment will be described. That is, the following mode may be adopted.
(1) In the information processing apparatus, the program may be installed in advance, or may be installed afterward, or the program may be stored in an external non-transitory storage medium, or may be operated by cloud computing.
(2) In the method, a computer may be functioned as an information processing apparatus and, in the information processing apparatus, the program may be installed in advance or may be installed afterwards, or the program may be stored in an external non-transitory storage medium, or may be operated by cloud computing.

6 Appendixes

The matters described in the above embodiments will be added below.

Appendix 1

A program executed by a computer 20 comprising a processor 29 and a memory 25, wherein the computer 20 stores in a storage unit 202 a trained model generated by training using as training data one or more types of words and a result of searching the Internet with a search engine using one or more types of words as a search query, the trained model receives a designated word which is a word designated by a user, and thereby outputs an article content, and the program causes the processor 29 to execute: receiving an input of at least a first word and a second word different from the first word as first designated words (S501); and outputting a first article content corresponding to the received first designated words, based on the received first word and second word and the trained model (S551).

Appendix 2

The program according to Appendix 1, wherein the trained model is generated by training based on a result in a predetermined search ranking range among results of a search on the Internet based on the search query, and the outputting (S551) includes outputting the first article content based on the received first word and second word and the trained model.

Appendix 3

The program according to Appendix 1 or 2, wherein the receiving (S501) includes receiving, as the first word and the second word included in the first designated words, a combination including at least one selected from a group consisting of a word relating to an industry type of the user, a word relating to a commercial area of the user, and a word describing or modifying the industry type or the commercial area, and the outputting (S551) includes outputting the first article content based on the received first designated words and the trained model.

Appendix 4

The program according to Appendix 1 or 2, wherein the program causes the processor 29 to further execute acquiring, from the user, information of a plurality of words describing or modifying a product or service that an organization to which the user belongs plans to newly release, the receiving (S501) includes receiving, as the first designated words, at least one word selected from a group consisting of a plurality of words describing or modifying the product or service that the organization to which the user belongs plans to newly release, and the outputting (S551) includes outputting the first article content based on the received first designated words and the trained model.

Appendix 5

The program according to any one of Appendixes 1 to 4, wherein when a second article content different from the first article content is output to the same user, the program causes the processor 29 to: receive an input of second designated words including at least one word different from the words constituting the first designated words; and output the second article content corresponding to the second designated words, based on the received second designated words and the trained model.

Appendix 6

The program according to any one of Appendixes 1 to 5, wherein the first article content is associated with a website managed by the user, and the program causes the processor 29 to further execute acquiring a result of an access by a second user who has accessed the first article content to the website managed by the user, and presenting to the user a graph illustrating the acquired result of the access.

Appendix 7

The program according to Appendix 1, wherein the computer 20 further stores in the storage unit 202 a second trained model generated by training using as training data a result of associating an article content with a result of an access by a second user who has accessed the article content to a website managed by the user, the second trained model receives, as an input, designated words which are words designated by the user, and thereby outputs a prediction result of a number of accesses by the second user who has accessed the article content to the website, and the program causes the processor 29 to execute: receiving an input of at least a third word and a fourth word different from the third word as third designated words; and outputting, based on the received third word and fourth word, the trained model, and the second trained model, a third article content corresponding to the received third designated words together with a prediction result of a number of accesses by the second user who has accessed the third article content to the website.

Appendix 8

The program according to Appendix 1, wherein the program causes the processor to further execute: receiving from the user an input operation for setting a schedule for outputting the article content; receiving, in response to the set schedule, the input of at least a first word and a second word different from the first word as the first designated words without receiving an input operation from the user; and outputting a first article content corresponding to the received first designated words, based on the received first word and second word and the trained model.

Appendix 9

A method executed by a computer 20 comprising a processor 29 and a memory 25, wherein the computer 20 stores in a storage unit 202 a trained model generated by training using as training data one or more types of words and a result of searching the Internet with a search engine using one or more types of words as a search query, the trained model receives a designated word which is a word designated by a user, and thereby outputs an article content, and the method comprises the following steps executed by the processor 29: receiving an input of at least a first word and a second word different from the first word as first designated words (S501); and outputting a first article content corresponding to the received first designated words, based on the received first word and second word and the trained model (S551).

Appendix 10

An information processing apparatus 20 comprising a control unit 203, wherein the information processing apparatus 20 stores in a storage unit 202 a trained model generated by training using as training data one or more types of words and a result of searching the Internet with a search engine using one or more types of words as a search query, the trained model receives, as an input, designated words which are words designated by a user, and thereby outputs an article content, and the information processing apparatus 20 causes the control unit 203 to execute: receiving an input of at least a first word and a second word different from the first word as first designated words (S501); and outputting a first article content corresponding to the received first designated words, based on the received first word and second word and the trained model (S551).

EXPLANATION OF REEERENCE NUMERALS

10: terminal apparatus, 12: communication interface, 13: input device, 14: output device, 15: memory, 16: storage unit, 19: processor, 20: server, 22: communication interface, 23: input/output interface, 25: memory, 26: storage, 29: processor, 80: network, 181: user information, 191: input operation reception unit, 192: transmission/reception unit, 193: data processing unit, 194: notification control unit, 132: display, 150: location information sensor, 160: camera, 281: user information database, 282: word information database, 283: registered word database, 284: trained model database, 2041: reception control module, 2042: transmission control module, 2043: user information acquisition module, 2044: word information acquisition module, 2045: registered word acquisition module, 2046: trained model reference module, 2047: article content creation module

The invention claimed is:

1. An information processing apparatus comprising a processing circuitry, wherein
the information processing apparatus stores in a storage unit a trained model generated by training using as training data multiple types of words and a result of searching Internet with a search engine using the multiple types of words as a search query, the multiple types of words being selected from a first type of words indicating areas, a second type of words indicating industry types, a third type of words indicating products or services, a fourth type of words describing or modifying areas, a fifth type of words describing or modifying industry types, or a sixth type of words describing or modifying products or services;
the trained model receives, as an input, designated words designated by a user, and thereby outputs an article content, and
the information processing apparatus causes the processing circuitry to execute:
receiving an input of at least a first word and a second word different in type from the first word as first designated words, the first word being one of the first, second, third, fourth, fifth, or sixth types of words; and
outputting a first article content corresponding to the received first designated words, based on the received first word and second word and the trained model,
wherein the trained model is generated by training based on a result in a predetermined search ranking range among results of a search on the Internet based on the search query;
wherein, the trained model is generated by training using as training data the multiple types of words and generalized sentences included in an article content included in the results of searching Internet with a search engine using the multiple types of words as a search query; and
the processing circuitry outputs the first article content separated from the generalized sentences included in the training data held in the storage unit by a predetermined range with respect to a distance between sentences included or a similarity between words included, based on the received first word and second words and the trained model.

2. The apparatus according to claim 1, wherein
the receiving includes receiving, as the first word and the second word included in the first designated words, a combination including at least one selected from a group consisting of a word relating to an industry type of the user, a word relating to a commercial area of the user, and a word describing or modifying the industry type or the commercial area, and
the outputting includes outputting the first article content based on the received first designated words and the trained model.

3. The apparatus according to claim 1, wherein
the information processing apparatus causes the processing circuitry to further execute acquiring, from the user, information of a plurality of words describing or modifying a product or service that an organization to which the user belongs plans to newly release,
the receiving includes receiving, as the first designated words, at least one word selected from a group consisting of a plurality of words describing or modifying the product or service that the organization to which the user belongs plans to newly release, and
the outputting includes outputting the first article content based on the received first designated words and the trained model.

4. The apparatus according to claim 1, wherein
when a second article content different from the first article content is output to the same user, the information processing apparatus causes the processing circuitry to:
receive an input of second designated words including at least one word different from the words constituting the first designated words; and
output the second article content corresponding to the second designated words, based on the received second designated words and the trained model.

5. The apparatus according to claim 1, wherein
the first article content is associated with a website managed by the user, and
the information processing apparatus causes the processing circuitry to further execute acquiring a result of an access by a second user, the second user having accessed the first article content to the website managed by the user, and presenting to the user a graph illustrating the acquired result of the access.

6. The apparatus according to claim 1, wherein
the information processing apparatus further stores in the storage unit a second trained model generated by training using as training data a result of associating an article content with a result of an access by a second user, the second user having accessed the article content to a website managed by the user,
the second trained model receives, as an input, designated words designated by the user, and thereby outputs a prediction result of a number of accesses by the second user who has accessed the article content to the website, and
the information processing apparatus causes the processing circuitry to execute:
receiving an input of at least a third word and a fourth word different from the third word as third designated words; and
outputting, based on the received third word and fourth word, the trained model, and the second trained model, a third article content corresponding to the received third designated words together with a prediction result of a number of accesses by the second user who has accessed the third article content to the website.

7. The apparatus according to claim 1, wherein
the information processing apparatus causes the processing circuitry to further execute:
receiving from the user an input operation for setting a schedule for outputting the article content;
receiving, in response to the set schedule, the input of at least a first word and a second word different from the first word as the first designated words without receiving an input operation from the user; and
outputting the first article content corresponding to the received first designated words, based on the received first word and second word and the trained model.

8. An information processing apparatus comprising a processing circuitry, wherein
the information processing apparatus stores in a storage unit a trained model generated by training using as training data multiple types of words and a result of searching Internet with a search engine using the multiple types of words as a search query, the multiple types of words being selected from a first type of words indicating areas, a second type of words indicating industry types, a third type of words indicating products or services, a fourth type of words describing or modifying areas, a fifth type of words describing or modifying industry types, or a sixth type of words describing or modifying products or services;

the trained model receives, as an input, designated words designated by a user, and thereby outputs an article content, and the information processing apparatus causes the processing circuitry to execute:

receiving an input of at least a first word and a second word different in type from the first word as first designated words, the first word being one of the first, second, third, fourth, fifth, or sixth types of words; and outputting a first article content corresponding to the received first designated words, based on the received first word and second word and the trained model, wherein the trained model is generated by training based on a result in a predetermined search ranking range among results of a search on the Internet based on the search query, wherein the processing circuitry executes to:

search on the Internet with the search engine using the first word and the second word as a search query;

extract, among results of the search, words with high frequency of appearance included in top search articles published on the Internet;

add the extracted words to the received first word and the second word; and output the first article content, based on the received first word and second word and the added words and the trained model.

9. The apparatus according to claim 8, wherein the information processing apparatus further stores in the storage unit a second trained model generated by training using as training data a result of associating an article content with a result of an access by a second user, the second user having accessed the article content to a website managed by the user, the second trained model receives, as an input, designated words designated by the user, and thereby outputs a prediction result of a number of accesses by the second user who has accessed the article content to the website, and the information processing apparatus causes the processing circuitry to execute:

receiving an input of at least a third word and a fourth word different from the third word as third designated words; and outputting, based on the received third word and fourth word, the trained model, and the second trained model, a third article content corresponding to the received third designated words together with a prediction result of a number of accesses by the second user who has accessed the third article content to the website.

10. A method executed by a computer comprising a processor and a memory, wherein the computer stores in a storage unit a trained model generated by training using as training data multiple types of words and generalized sentences included in an article content included in results of searching Internet with a search engine using the multiple types of words as a search query, the multiple types of words being selected from a first type of words indicating areas, a second type of words indicating industry types, a third type of words indicating products or services, a fourth type of words describing or modifying areas, a fifth type of words describing or modifying industry types, or a sixth type of words describing or modifying products or services;

the trained model receives, as an input, designated words designated by a user, and thereby outputs an article content, the method comprises the following steps executed by the processor: receiving an input of at least a first word and a second word different in type from the first word as first designated words, the first word being one of the first, second, third, fourth, fifth, or sixth types of words; and outputting a first article content separated from the generalized sentences included in the training data held in a storage unit by a predetermined range with respect to a distance between sentences included or a similarity between words included, based on the received first word and second words and the trained model, wherein the trained model is generated by training based on a result in a predetermined search ranking range among results of a search on the Internet based on the search query.

11. A method executed by a computer comprising a processor and a memory, wherein the computer stores in a storage unit a trained model generated by training using as training data multiple types of words and a result of searching the Internet with a search engine using the multiple types of words as a search query, the multiple types of words being selected from a first type of words indicating areas, a second type of words indicating industry types, a third type of words indicating products or services, a fourth type of words describing or modifying areas, a fifth type of words describing or modifying industry types, or a sixth type of words describing or modifying products or services;

the trained model receives, as an input, designated words designated by a user, and thereby outputs an article content, the method comprises the following steps executed by the processor:

receiving an input of at least a first word and a second word different in type from the first word as first designated words, the first word being one of the first, second, third, fourth, fifth, or sixth types of words;

searching on the Internet with the search engine using the first word and the second word as a search query;

extracting, among results of the search, words with high frequency of appearance included in top search articles published on the Internet;

adding the extracted words to the received first word and the second word; and outputting the first article content, based on the received first word and second word and the added words and the trained model, wherein the trained model is generated by training based on a result in a predetermined search ranking range among results of a search on the Internet based on the search query.

* * * * *